US012744025B2

(12) United States Patent
Choi

(10) Patent No.: US 12,744,025 B2
(45) Date of Patent: Sep. 22, 2026

(54) VEHICLE CALL SYSTEM BASED ON ACTIVE NOISE CONTROL AND METHOD THEREFOR

(71) Applicant: HYUNDAI MOBIS CO., LTD., Seoul (KR)

(72) Inventor: Do Il Choi, Paldal-gu (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 456 days.

(21) Appl. No.: 18/059,380

(22) Filed: Nov. 28, 2022

(65) Prior Publication Data

US 2023/0368767 A1 Nov. 16, 2023

(30) Foreign Application Priority Data

May 11, 2022 (KR) ........................ 10-2022-0057926

(51) Int. Cl.
*G10K 11/178* (2006.01)
*G10L 17/00* (2013.01)
*H04R 1/32* (2006.01)

(52) U.S. Cl.
CPC ........ *G10K 11/17823* (2018.01); *G10L 17/00* (2013.01); *H04R 1/326* (2013.01); *H04R 2499/13* (2013.01)

(58) Field of Classification Search
CPC .. G10K 11/17823; G10L 17/00; H04R 1/326; H04R 2499/13
See application file for complete search history.

(56) References Cited

U.S. PATENT DOCUMENTS 7,171,006 B2 * 1/2007 Kimura ............... B60R 16/0373 381/86
9,202,456 B2 * 12/2015 Lee .................. G10K 11/17837
9,641,934 B2 * 5/2017 Herbig ................... H04R 1/406
2006/0273855 A1 * 12/2006 Matsui .................... H03F 3/181 330/192
2018/0190306 A1 * 7/2018 Hetherington .......... G10L 21/02

FOREIGN PATENT DOCUMENTS

KR 2021-0096879 8/2021

OTHER PUBLICATIONS

English Language Abstract of KR 2021-0096879 published Aug. 6, 2021.

* cited by examiner

*Primary Examiner* — Carolyn R Edwards
*Assistant Examiner* — Dylan Maguire Neece
(74) *Attorney, Agent, or Firm* — DLA PIPER LLP US

(57) ABSTRACT

A voice call method based on active noise control including: activating a plurality of active noise cancellation (ANC) microphones positioned in a vehicle to respectively correspond to locations of occupants; classifying a talker primarily based on a talker tone for a received voice signal of a counterpart as a call is connected with the counterpart; classifying the talker secondarily by receiving a voice signal of the occupant in the vehicle that is output through a speaker in the vehicle, through the ANC microphone; matching the speaker positioned at the location of the occupant corresponding to the talker with each occupant as the classification of the talker is completed; and reproducing a call voice through the matched speaker.

16 Claims, 4 Drawing Sheets

VEHICLE CALL SYSTEM BASED ON ACTIVE NOISE CONTROL AND METHOD THEREFOR

CROSS-REFERENCE TO RELATED APPLICATION

This application claims priority to and the benefit of Korean Patent Applications Nos. 10-2022-0057926, filed on May 11, 2022, the disclosures of which are incorporated herein by references in their entirety.

BACKGROUND

Technical Field

The present disclosure relates to vehicle call system and method based on active noise control.

Related Art

A driver may make a phone call by using an in-vehicle communication system. Examples of the method to make a call may include a method to make a call by using the driver's phone by pairing a Bluetooth module inside an audio, video & navigation (AVN) system with the driver's mobile phone supporting a Bluetooth function, and a method to make a center call or a center phone call by using a communication modem included in a telematics unit.

Meanwhile, an existing vehicle is set up and operated for an occupant on a driver seat or a front passenger seat to make a call by using two call microphones installed between the driver seat and the front passenger seat. In addition, during the call, a counterpart voice may be reproduced in the same way through all speaker channels provided in the vehicle.

The prior art thus has a problem in that a call voice of a second-row occupant may be inaccurately delivered to the counterpart because no call microphone is installed at a position of the second-row occupant.

In this case, an additional call microphone may be installed and operated in the back seat. However, this method may be economically disadvantageous, and there is no economic advantage in that this method only further includes technology for channel separation.

SUMMARY

Various embodiments are directed to providing vehicle call system and method based on active noise control, which may effectively deliver occupant utterance as well as driver utterance to a counterpart when a talker makes a call while a vehicle is driven by classifying the talker by an active noise cancellation (ANC) microphone, and delivering a talker voice in three dimensions through speakers positioned at a plurality of locations.

However, technical tasks of the present disclosure are not limited to the above tasks, and other tasks may exist.

In an embodiment, a voice call method based on active noise control including: activating a plurality of active noise cancellation (ANC) microphones positioned in a vehicle to respectively correspond to locations of occupants; classifying a talker primarily based on a talker tone for a received voice signal of a counterpart as a call is connected with the counterpart; classifying the talker secondarily by receiving a voice signal of the occupant in the vehicle that is output through a speaker in the vehicle, through the ANC microphone; matching the speaker positioned at the location of the occupant corresponding to the talker with each occupant as the classification of the talker is completed; and reproducing a call voice through the matched speaker.

In another embodiment, a vehicle call system based on active noise control includes: a plurality of active noise cancellation (ANC) microphones positioned in a vehicle to respectively correspond to locations of occupants; a plurality of speakers each outputting a talker voice; and a controller classifying a talker primarily based on a talker tone for a received voice signal of a counterpart as a call is connected with the counterpart, classify the talker secondarily by receiving a voice signal of the occupant in the vehicle that is output through the speaker, through the ANC microphone, and match the speaker positioned at the location of the occupant corresponding to the talker with each occupant as the classification of the talker is completed.

In still another embodiment, a computer program may be combined with a computer as hardware to execute the vehicle call system and method based on active noise control, and stored in a computer-readable recording medium.

Other details of the present disclosure are described in the detailed description and the accompanying drawings.

DETAILED DESCRIPTION

Various advantages and features of the present disclosure and methods accomplishing them will become apparent from the following description of embodiments described below in detail with reference to the accompanying drawings. However, the present disclosure is not limited to the embodiments described below, and may be implemented in various different forms. The embodiments are provided only to make the present disclosure complete and to allow those skilled in the art to completely appreciate the scope of the present disclosure. Accordingly, the present disclosure is defined only by the scope of the claims.

Terms used in this specification are for explaining the embodiments rather than limiting the present disclosure. In the present disclosure, a term of a singular number may include its plural number unless explicitly indicated otherwise in the context. A term "comprise" and/or "comprising" used in the specification do not preclude the presence or addition of one or more other components in addition to the mentioned component. The same reference number may designate the same component throughout the specification, the term "and/or" may include any one or all combinations of the mentioned components. Expressions "first," "second" and the like may be used to indicate various components, and do not limit the corresponding components. These expressions are used only to distinguish one component from the other components. A "first" component may thus be named a "second" component within the scope of the present disclosure.

Unless defined otherwise, all terms (including technical and scientific terms) used in this specification have the same meaning as meanings commonly understood by those skilled in the art to which the present disclosure pertains. In addition, terms generally used as defined in a dictionary are not to be interpreted as having ideal or excessively formal meanings unless clearly indicated otherwise.

Hereinafter, a vehicle call system 100 based on active noise control according to an embodiment of the present disclosure is described with reference to FIGS. 1 to 5.

Figure 1:
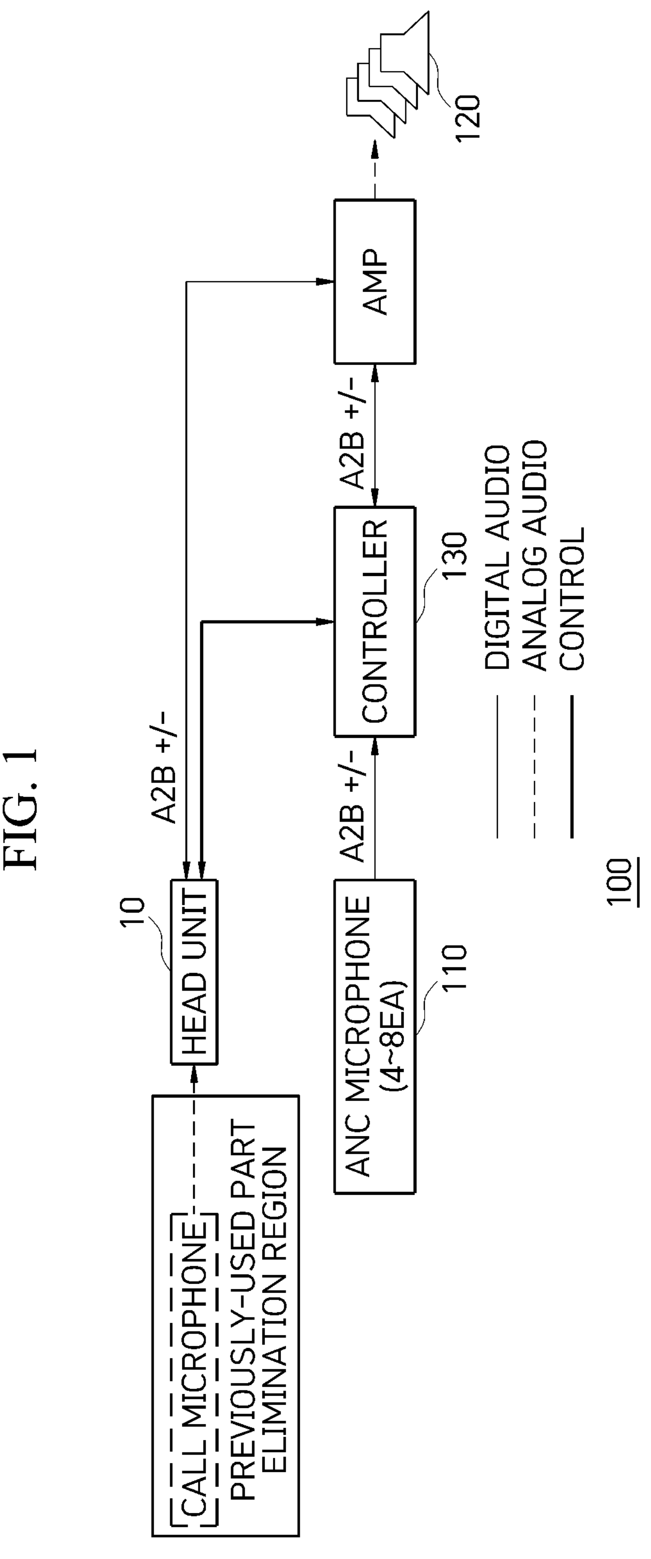
FIG. 1 is a view for explaining a configuration of a vehicle call system according to an embodiment of the present disclosure.
Figure 2:
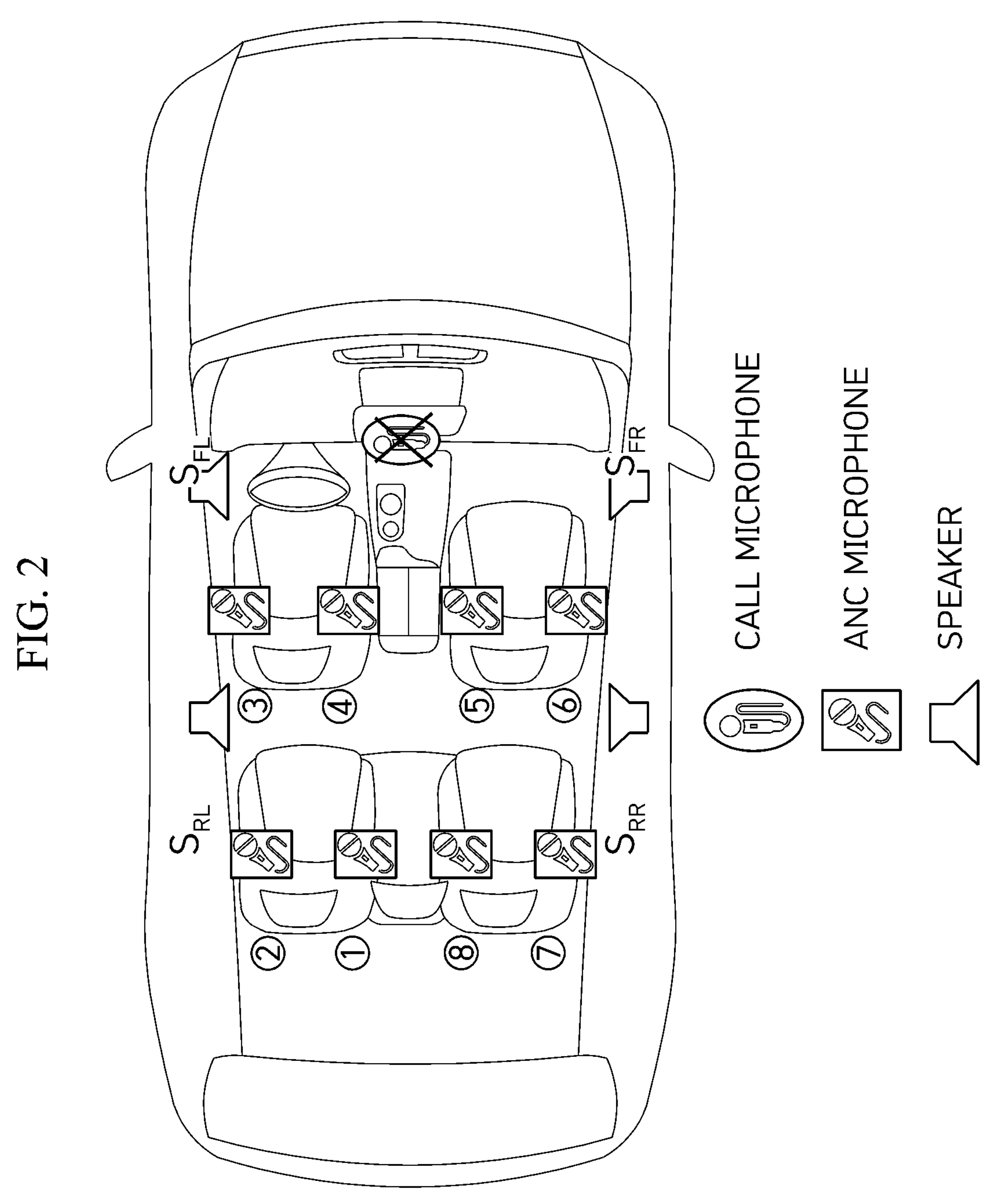
FIG. 2 is a view exemplifying locations of an active noise cancellation (ANC) microphone and a speaker in a vehicle.

FIG. 1 is a view for explaining a configuration of a vehicle call system 100 according to an embodiment of the present disclosure. FIG. 2 is a view exemplifying locations of an active noise cancellation (ANC) microphone 110 and a speaker 120 in a vehicle.

The vehicle call system 100 according to an embodiment of the present disclosure may include the ANC microphone 110, the speaker 120 and a controller 130.

The plurality of ANC microphones 110 may be positioned in the vehicle to respectively correspond to locations of occupants. For example, the ANC microphone 110 may be mounted in a headlining part which may determine a talker, and four to eight ANC microphones 110 may be located corresponding to the number of seats in the vehicle.

In an embodiment of the present disclosure, two ANC microphones 110 may be provided as a pair for each vehicle seat, and may identify a location of the talker as a talker voice signal is input to the ANC microphone 110.

The speaker 120 may output a talker voice which is a counterpart voice or received through the ANC microphone 110, and may be located at least for each location of the vehicle seat.

Here, in an embodiment of the present disclosure, the location of the occupant in advance may be detected in advance by detecting whether the occupant sits on the seat, and the number and location of the talker in the vehicle may thus also be accurately determined when a call is connected. When the number and location of the talker are identified, the corresponding ANC microphone 110 may be set to higher sensitivity than that of the ANC microphone 110 of another seat whenever the voice signal is output based on talker utterance.

Meanwhile, an embodiment of the present disclosure may not include a call microphone that is generally installed in the vehicle. That is, it is possible to reduce a production cost by eliminating the call microphone from a vehicle to which the ANC microphone 110 is applied.

Figure 3:
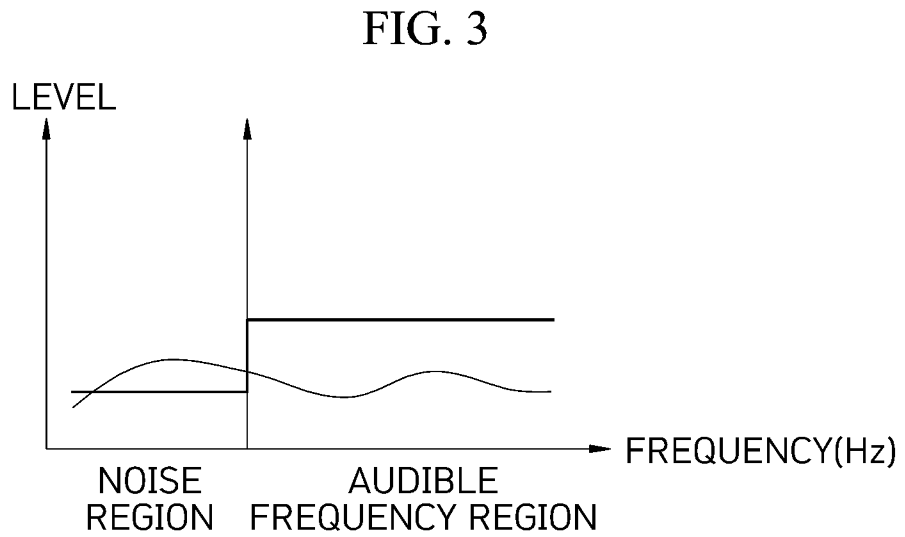
FIG. 3 is a view for explaining logic of separating noise and a voice signal from each other by using the ANC microphone.

FIG. 3 is a view for explaining logic of separating noise and the voice signal from each other by using the ANC microphone 110.

Basically, the ANC microphone 110 may perform an ANC function until a call is connected. When performing the ANC function, the ANC microphone 110 may only use a predetermined frequency band (e.g., frequency of 500 Hz or less) by removing an input signal in an audible frequency region through a filter.

In an embodiment of the present disclosure, the noise and the voice signal may be separated from each other by using the ANC microphone 110.

That is, in the present disclosure, the noise and the voice signal, received through the ANC microphone 110, may be separated from each other by determining whether a sound exceeds a predetermined reference frequency and a predetermined reference level.

Referring to FIG. 3, the reference frequency and reference level indicated by straight lines may be set, and it may be determined that a sound having a level value more than the reference level is the valid voice signal, and a sound having a level value less than or equal to the reference level is the noise. In addition, it may be determined that a value of the reference frequency or less is in a noise region rather than an audible frequency region. The plurality of ANC microphones 110 may be set to satisfy this condition to thus receive the talker voice signal, and have adjusted input sensitivity after the talker voice signal is identified to thus produce an improved call quality.

Referring back to FIG. 1, a call connection may be started with a counterpart. Here, the controller 130 may classify a counterpart voice signal from an occupant voice signal, and then deliver a talker voice to the counterpart in three dimensions while outputting an optimal call voice through the speaker 120.

Figure 4:
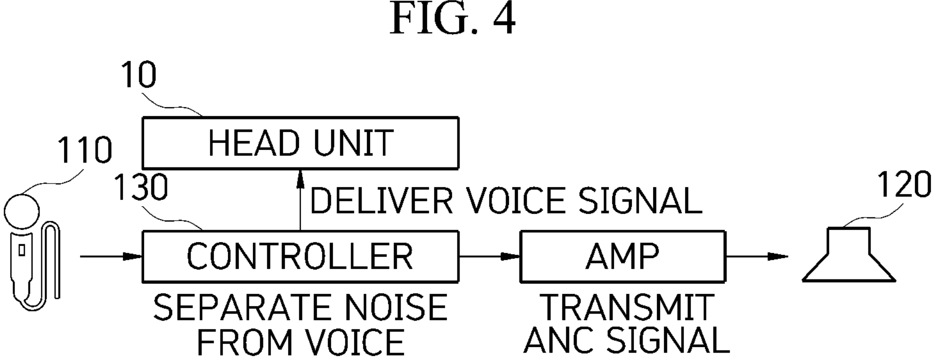
FIG. 4 is a view showing a case of delivering a voice signal of a talker in the vehicle.
Figure 5:
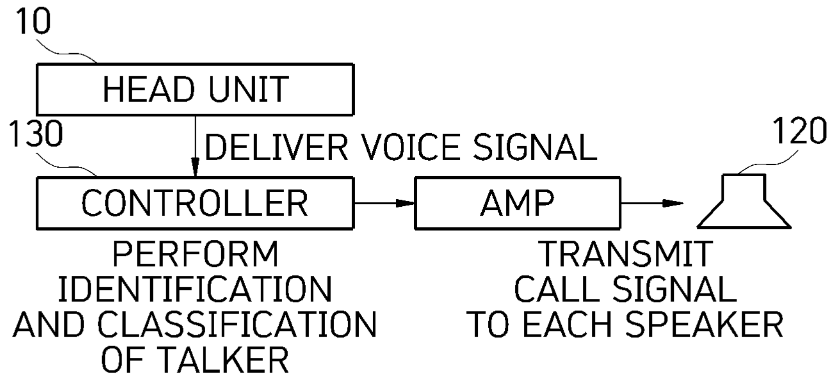
FIG. 5 is a view showing a case of receiving a counterpart voice signal.

FIG. 4 is a view showing a case of delivering the voice signal of the talker in the vehicle. FIG. 5 is a view showing a case of receiving the counterpart voice signal.

When the occupant in the vehicle utters, the controller 130 may receive the talker voice signal, remove the noise received together with the voice signal to thus deliver the voice signal to the counterpart through a head unit 10, and then output the corresponding voice through the speaker 120.

In addition, when receiving the counterpart voice through the head unit 10, the controller 130 may classify the talker voice signal in the vehicle, and set the speaker 120 matched with the talker to a higher output than those of the other speakers 120 to thus output the call voice. Here, when determining that a multi-party call is in progress, the controller 130 may adjust the outputs of the plurality of speakers 120 corresponding to the plurality of talkers in the vehicle for the call to be made in three dimensions.

Hereinafter, a detailed method performed by the vehicle call system 100 is described with reference to FIG. 6.

Figure 6:
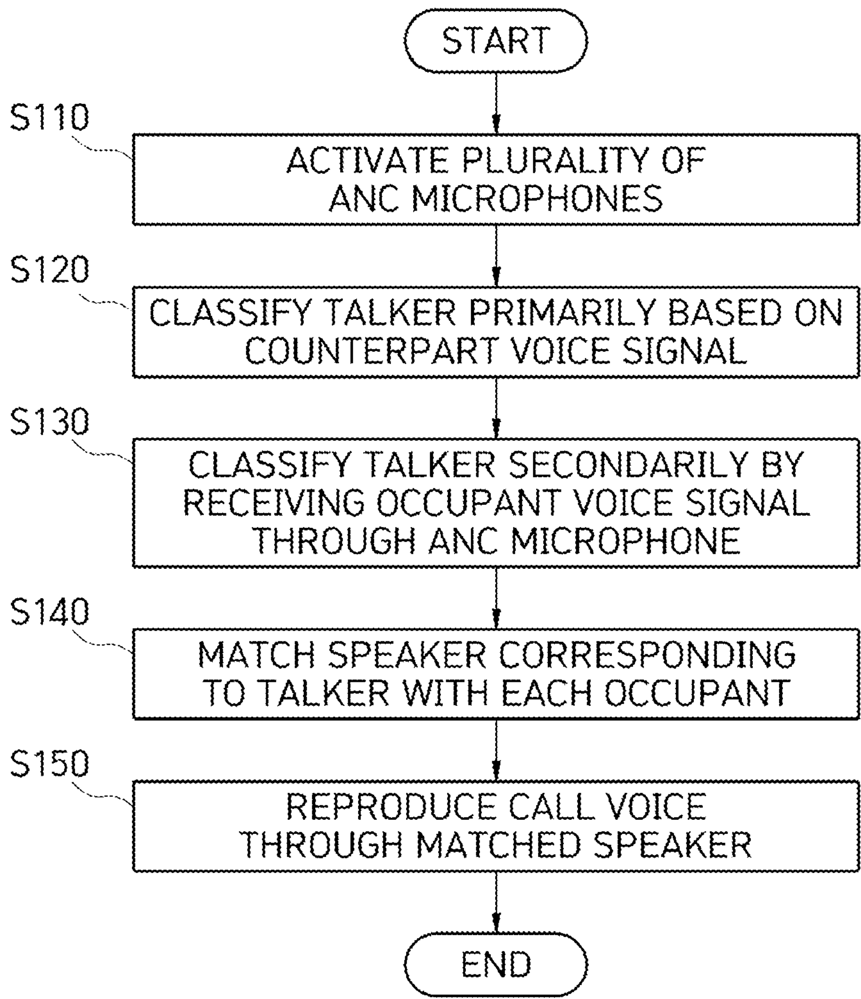
FIG. 6 is a flowchart of a voice call method according to another embodiment of the present disclosure.

FIG. 6 is a flowchart of a voice call method according to another embodiment of the present disclosure. Meanwhile, each step shown in FIG. 6 may be understood to be performed by the vehicle call system 100 described above with reference to FIGS. 1 to 5, and is not necessarily limited thereto.

According to the voice call method according to another embodiment of the present disclosure, a plurality of active noise cancellation (ANC) microphones 110 positioned in a vehicle may be first activated to respectively correspond to locations of occupants (S110).

In another embodiment, the ANC microphone 110 may be activated when a vehicle speed of the vehicle satisfies a predetermined range. For example, the ANC microphone 110 may be operated in a vehicle speed range of 30 Km to 120 Km after the vehicle is started. The reason is that: there is almost no noise such as wind noise in a low speed section, and it is thus preferable not to operate the ANC microphone 110; and there occurs relatively large noise in a high speed section, the ANC microphone 110 has thus an insignificant effect even when operated, and it is thus preferable not to operate the ANC microphone 110.

Here in another embodiment of the present disclosure, a call is basically possible regardless of the vehicle speed, that is, whether the ANC microphone 110 is activated or not. In other words, the call is possible in any state regardless of an ON or OFF state of the ANC microphone 110, and the ANC microphone 110 may be additionally activated when the vehicle speed is in the predetermined range.

Next, a talker may be classified primarily based on a talker tone for a received voice signal of a counterpart as the call is connected with the counterpart (S120). That is, the uttering counterpart may first be identified by comparing the tone for a counterpart voice received through a phone.

The talker may then be classified secondarily by receiving a voice signal of the occupant in the vehicle that is output through a speaker 120 in the vehicle, through the ANC microphone 110 (S130). That is, the talker may be classified when receiving the call by feeding back an occupant voice, secondarily reproduced through the speaker 120, to the ANC microphone 110.

Next, the speaker 120 positioned at the location of the occupant corresponding to the talker may be matched with each occupant as the classification of the talker is completed (S140), and a call voice may be reproduced through the matched speaker 120 (S150).

For example, when the classification of the talker is completed, the speaker 120 adjacent to a driver seat may be matched with a driver who is a first talker, and the speaker 120 adjacent to a front passenger seat may be matched with an occupant on the front passenger seat, who is a second talker, through the surround speaker 120.

In addition, when another talker is added, his/her call voice may be reproduced after the talker is matched with each speaker 120 located in a back seat of the driver seat or a back seat of the front passenger seat.

When the driver is the only talker, the speaker 120 matched with the driver may be set to a higher output than those of the other speakers 120, and the other speakers 120 may be set to a lower output than a basic output.

In another embodiment of the present disclosure, the classification of the talker may be performed for a plurality of occupants when the plurality of occupants exist in the vehicle.

In addition, in another embodiment of the present disclosure, the call voice may be reproduced by reducing the output of the speaker 120 in the vehicle by a predetermined first ratio (e.g., 50%) compared to existing output of the speaker when the call is in progress while the ANC is operated. This configuration is to prevent a talker voice signal output through the speaker 120 from being spread when the plurality of talkers exist in the vehicle.

In addition, the call voice may be reproduced by variably adjusting the output of each speaker 120 matched with each occupant to correspond to the location of the occupant currently utters among the plurality of occupants. Here, the call voice may be reproduced by further reducing the output of the speaker 120 corresponding to the location of the occupant currently utters among the plurality of occupants by a second ratio (e.g., 10%) in addition to the predetermined first ratio.

For example, it may be assumed that three occupants are respectively on the driver seat, the front passenger seat, and the back seat of the driver seat. In this case, as the call is started, the call voice may be reproduced by reducing the output of the speaker 120 matched with each talker by 50%, which is the first ratio, compared to the existing output. Here, the speaker 120 corresponding to the back seat of the passenger seat has no talker matched therewith, and may thus be set to have a lower output than that of the matched speaker 120.

When the talker is the driver sitting on the driver seat, the speaker 120 corresponding to the driver seat may then have the output reduced by 60% added by 10% to the first ratio, and the rest speakers 120 corresponding to the front passenger seat and the back seat of the driver seat may maintain the output reduced by 50%.

As such, when the call is started in a state where an ANC function is maintained, the outputs of all the speakers 120 may be primarily reduced to prevent the voice output through the speaker 120 from being spread out and then input to the ANC microphone 110 and again output through the speaker 120. Next, current talker utterance may be secondarily prevented from being interrupted due to a delay occurring between his/her utterance and the output of the speaker 120 by further reducing the output of the speaker 120 corresponding to the talker. A problem may also be solved that the talker voice is output louder through the speaker 120 corresponding to another occupant because the output of the speaker 120 and the talker utterance simultaneously overlapping each other, and the ANC microphone 110 of another occupant receives the same.

Meanwhile, in another embodiment of the present disclosure, the applied second ratio may be determined to correspond to a volume of the current talker voice, i.e., magnitude of the voice signal. For example, the second ratio applied to the output of the speaker 120 corresponding to the current talker may be 20% which is a double ratio when a magnitude of a voice signal of the current talker is greater than or equal to a predetermined first threshold. For another example, the second ratio applied to the output of the speaker 120 corresponding to the current talker may be 30% which is a triple ratio when the magnitude of the voice signal of the current talker is greater than or equal to a second threshold which is greater than the predetermined first threshold.

As such, in another embodiment of the present disclosure, the output of the speaker 120 corresponding to the talker may be adjusted based on the magnitude of the talker voice signal, thereby further preventing the voice signal from being excessively output as described above due to continuous talker utterance and output of the speaker 120 corresponding to another occupant.

For still another example, in the present disclosure, the output of the speaker 120 corresponding to another occupant may be adjusted by determining a direction of the talker voice (or voice signal). To this end, in the present disclosure, the output of the speaker 120 corresponding to another occupant may be adjusted by calculating a vector component in the talker voice signal, and using information on the sizes and angles of basic components (or x-axis component and y-axis component) of the vector component for the talker.

For example, the driver basically needs to watch the front, and a direction vector of the voice signal may thus be the 12 o'clock direction basically when the driver is the talker. In this case, there is no direction vector of the voice signal toward another occupant, and the speaker 120 may thus maintain the output reduced by the first ratio and the second ratio while the call is in progress.

On the other hand, the occupant on the front passenger seat may utter while his/her head is turned toward the driver as well as the front. Here, assuming that the occupant utters while his/her head is turned toward the driver at an angle of 45 degrees, the corresponding vector component may include a y-axis component of 12 o'clock direction and an x-axis component of 9 o'clock direction. In this case, the first and second ratios may be not only applied to the speaker 120 corresponding to the front passenger seat occupant, who is the talker, but also applied to the speaker 120 corresponding to the driver seat.

Alternatively, a ratio corresponding to the magnitude information may be applied to the speaker 120 corresponding to the talker sitting on the front passenger seat together with the basic ratio of the second ratio, and the rest of the second ratio, remaining after being applied to the speaker 120 corresponding to the talker sitting on the front passenger seat, may be applied to the speaker 120 corresponding to the non-talker sitting on the driver seat, rather than equally applying the first and second ratios to the speaker 120 corresponding to the talker sitting on the front passenger seat and the non-talker sitting on the driver seat. For example, a total ratio of 58% including the first ratio of 50%, the basic ratio of 5% of the second ratio, and 3% of the second ratio determined based on the magnitude information may be applied to the speaker 120 corresponding to the talker sitting on the front passenger seat, and a total ratio of 52% including the first ratio of 50% and the rest 2% of the second ratio may be applied to the speaker 120 corresponding to the non-talker sitting on the driver seat.

In this case, as described above, a readjusted ratio value may be applied as an application ratio value of the second ratio depends on the magnitude of the talker voice signal.

Meanwhile, steps S110 to S150 described in the above detailed description may be further divided into additional steps or combined into fewer steps, in some embodiments of the present disclosure. In addition, some steps may be omitted as needed, and an order between the steps may be changed. In addition, the contents of FIGS. 1 to 5 may be applied to the contents of the voice call method of FIG. 6 even when other contents are omitted.

The voice call method based on active noise control according to another embodiment of the present disclosure described above may be implemented as a program (or application) to be executed in combination with a computer, which is hardware, and stored in a medium.

In order for the computer to read the program and execute the methods implemented as the program, the above-described program may include a code coded in a computer language such as C, C++, JAVA, Ruby, machine language or the like, which may be read by a processor (CPU) of the computer through a device interface of the computer. The code may include a functional code related to a function defining functions necessary for executing the above methods and the like, and include a control code related to an execution procedure, which is necessary for the processor of the computer to execute the functions according to a predetermined procedure. In addition, the code may further include a memory reference code indicating from which location (or address) of the internal or external memory of the computer additional information or media necessary for the processor of the computer to execute the functions is to be referenced. In addition, the code may further include a communication-related code indicating how to communicate with any other computer, server or the like in a remote location by using a communication module of the computer, what information or media to be transmitted and received during the communication or the like when the processor of the computer needs to communicate with any other computer, server or the like in a remote location in order to execute the functions.

The storage medium indicates not a medium that temporarily stores data, such as a register, a cache, a memory or the like, but a medium that semi-permanently stores data and is readable by a device. In detail, the storage medium may include, for example, a read only memory (ROM), a random access memory (RAM), a compact disk read only memory (CD-ROM), a magnetic tape, a floppy disk, an optical data storage device or the like, and may not be limited thereto. That is, the program may be stored in various recording media on various servers that the computer may access or in various recording media on the computer of a user. In addition, the medium may be distributed in a network-connected computer system, and a computer-readable code may be stored in a distributed manner.

The above-described embodiments are illustratively provided, and it is apparent to those skilled in the art to which the present disclosure pertains that the present disclosure may be easily modified in another specific form without any change in its technical idea or essential characteristics. Therefore, it is to be understood that the embodiments described above are illustrative rather than being restrictive in all aspects. For example, the components each described as a single type may also be implemented in a distributed manner, and similarly, the components described as being distributed from each other may also be implemented in a combined manner.

As set forth above, according to the embodiments of the present disclosure described above, it is possible to more efficiently perform the multi-party call involving another occupant as well as the driver himself/herself based on the ANC microphones, thereby increasing the driver's concentration on the driving and providing the calling counterpart with the smooth communication.

It is also possible to reduce the production cost because the ANC-applied vehicle eliminates the existing call microphone and uses the ANC-applied microphone.

It is also possible to identify the talker more clearly during the call or conference call between the driver and the occupant, and deliver the talker voice of any of various locations in three dimensions through the surround sound.

Advantageous effects of the present disclosure are not limited to those mentioned above, and other effects not mentioned here may be obviously understood by those skilled in the art from the following description.

It is to be understood that the scope of the present disclosure is defined by the claims disclosed below rather than the detailed description provided above, and includes all alternations and modifications derived from the claims and their equivalents.

What is claimed is:

1. A voice call method based on active noise control, the method comprising:

activating, when a speed of the vehicle falls within a predetermined range, an active noise cancellation (ANC) microphone among a plurality of ANC microphones positioned in a vehicle and respectively corresponding to locations of occupants in the vehicle, wherein the ANC microphone remains deactivated when the speed of the vehicle is higher than an upper limit of the predetermined range, and wherein the ANC microphone remans deactivated when the speed of the vehicle is lower than a lower limit of the predetermined range;

initially classifying a talker based on a talker tone of a received voice signal from a counterpart during a call with the counterpart;

further classifying the talker by receiving a voice signal, through the ANC microphone, of an occupant in the vehicle that is output through a speaker in the vehicle;

matching the speaker positioned at the location of the occupant corresponding to the talker; and reproducing a call voice through the matched speaker.

2. The method of claim 1, wherein the call voice is reproduced by reducing output of the speaker by a predetermined first ratio compared to an existing output of the speaker when the plurality of occupants exist in the vehicle.

3. The method of claim 2, wherein the call voice is reproduced by variably adjusting the output of each speaker matched with each occupant to correspond to the location of the occupant who currently utters.

4. The method of claim 3, wherein the call voice is reproduced by further reducing the output of the speaker corresponding to the location of the occupant who currently utters by a second ratio in addition to the first ratio.

5. The method of claim 4, wherein in reproducing the call voice through the matched speaker:

the second ratio corresponding to a predetermined first threshold is applied to the output of the speaker corresponding to a current talker when a magnitude of a voice signal of the current talker is greater than or equal to the first threshold, and the second ratio corresponding to a second threshold is applied to the output of the speaker corresponding to the current talker when the magnitude of the voice signal of the current talker is greater than or equal to the second threshold greater than the first threshold.

6. The method of claim 4, wherein in the reproducing of the call voice through the matched speaker, output of the speaker corresponding to another occupant is adjusted by determining a direction of the voice signal of a current talker among the plurality of occupants.

7. The method of claim 6, wherein the output of the speaker corresponding to another occupant is adjusted by calculating a vector component in the voice signal of the current talker, and using information on sizes and angles of basic components of the vector component for the current talker.

8. The method of claim 1, wherein no call microphone is installed in the vehicle.

9. The method of claim 1, further comprising separating noise and the voice signal, received through the ANC microphone, by determining whether the noise or the voice signal exceeds a predetermined reference frequency and a predetermined reference level.

10. A vehicle call system based on active noise control, the system comprising:

a plurality of active noise cancellation (ANC) microphones positioned in a vehicle to respectively correspond to locations of occupants within the vehicle;

a plurality of speakers, each configured to output a talker voice; and a controller configured to:

activate, when a speed of the vehicle falls within a predetermined range, an ANC microphone among the plurality of ANC microphones, wherein the ANC microphone remains deactivated when the speed of the vehicle is higher than an upper limit of the predetermined range, and wherein the ANC microphone remans deactivated when the speed of the vehicle is lower than a lower limit of the predetermined range, initially classify a talker based on a talker tone in a received voice signal of a counterpart during a call with the counterpart, further classify the talker by receiving a voice signal, through the ANC microphone, of the occupant that is output through the speaker, and match the speaker positioned at the location of the occupant corresponding to the talker.

11. The system of claim 10, wherein the controller is configured to reproduce a call voice by reducing output of the speaker in the vehicle by a predetermined first ratio compared to an existing output of the speaker.

12. The system of claim 11, wherein the controller is configured to reproduce the call voice by further reducing the output of each speaker matched with each occupant to correspond to the location of the occupant that currently utters by a second ratio lower than the first ratio.

13. The system of claim 12, wherein the controller is configured to apply the second ratio corresponding to a predetermined first threshold to the output of the speaker corresponding to a current talker when a magnitude of a voice signal of the current talker is greater than or equal to the first threshold, and apply the second ratio corresponding to a second threshold to the output of the speaker corresponding to the current talker when the magnitude of the voice signal of the current talker is greater than or equal to the second threshold greater than the first threshold.

14. The system of claim 12, wherein the controller is configured to adjust output of the speaker corresponding to another occupant by determining a direction of the voice signal of a current talker among the plurality of occupants.

15. The system of claim 14, wherein the controller is configured to adjust the output of the speaker corresponding to another occupant by calculating a vector component in the voice signal of the current talker, and using information on sizes and angles of basic components of the vector component for the current talker.

16. A voice call method based on active noise control, the method comprising:

activating, when a speed of the vehicle falls within a predetermined range, an active noise cancellation (ANC) microphone among a plurality of ANC microphones positioned in a vehicle and respectively corresponding to locations of occupants in the vehicle, wherein the ANC microphone remains deactivated when the speed of the vehicle is higher than an upper limit of the predetermined range, and wherein the ANC microphone remans deactivated when the speed of the vehicle is lower than a lower limit of the predetermined range;

initially classifying a talker based on a talker tone of a received voice signal from a counterpart during a call with the counterpart;

further classifying the talker by receiving a voice signal, through the ANC microphone, of an occupant in the vehicle that is output through a speaker of a plurality of speakers in the vehicle;

matching the speaker positioned at the location of the occupant corresponding to the talker; and reproducing a call voice through the matched speaker, wherein the method further comprises:

reducing, in response to the call being started and the ANC being activated, output of all of the plurality of speakers in the vehicle by a first ratio compared to an existing output of the plurality of speakers; and further reducing output of a speaker corresponding to a current talker by a second ratio in addition to the first ratio.

* * * * *